United States Patent [19]
Golovatai-Schmidt

[11] Patent Number: 5,244,438
[45] Date of Patent: Sep. 14, 1993

[54] TENSION FOR BELTS OR CHAINS

[75] Inventor: Eduard Golovatai-Schmidt, Nuremberg, Fed. Rep. of Germany

[73] Assignee: Ina Walziager Schaeffler KG, Fed. Rep. of Germany

[21] Appl. No.: 950,075

[22] Filed: Sep. 23, 1992

[30] Foreign Application Priority Data

Mar. 27, 1992 [DE] Fed. Rep. of Germany ....... 4209914

[51] Int. Cl.$^5$ ............................................... F16H 7/08
[52] U.S. Cl. .................................... 474/112; 474/117
[58] Field of Search ............... 474/101, 112, 113, 117, 474/135

[56] References Cited

U.S. PATENT DOCUMENTS 4,551,120 11/1985 Thomey .......................... 474/112 X
4,832,665 5/1989 Kadota et al. ...................... 474/112
4,934,987 6/1990 Kadota et al. ...................... 474/112

Primary Examiner—Thuy M. Bui
Attorney, Agent, or Firm—Bierman and Muserlian

[57] ABSTRACT

A pre-adjustable, spring-loadable tensioner for belts or chains, in particular for a control gear of an internal combustion engine, comprising a tension roller (2) mounted on a tension roller support (3) of eccentric configuration which in turn is guided on an eccentric inner component which can be screwed onto a housing (20), the tensioner (1) further comprising a spring (12, 29) resiliently urging the tension roller support (3) against the housing (20), characterized in that the inner component comprises a flanged eccentric bush (5) which engages freely rotatable into a base plate (7) which is guided by a radial guide arm (9) on the housing (20).

16 Claims, 3 Drawing Sheets

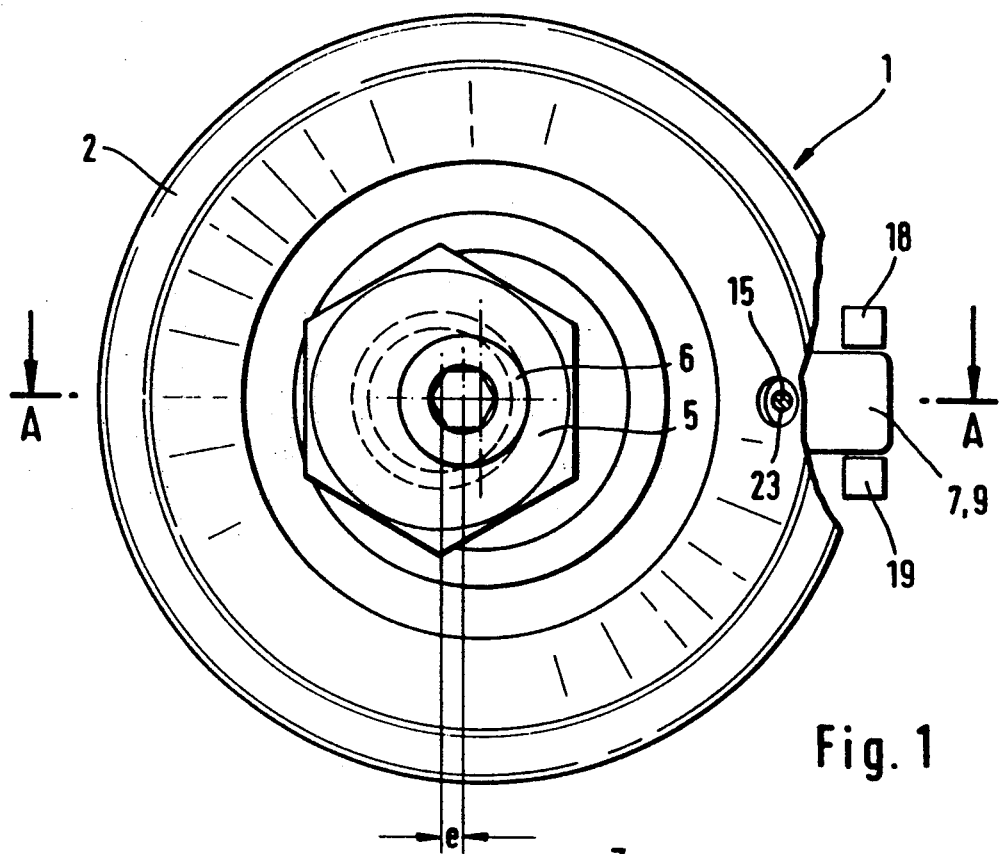
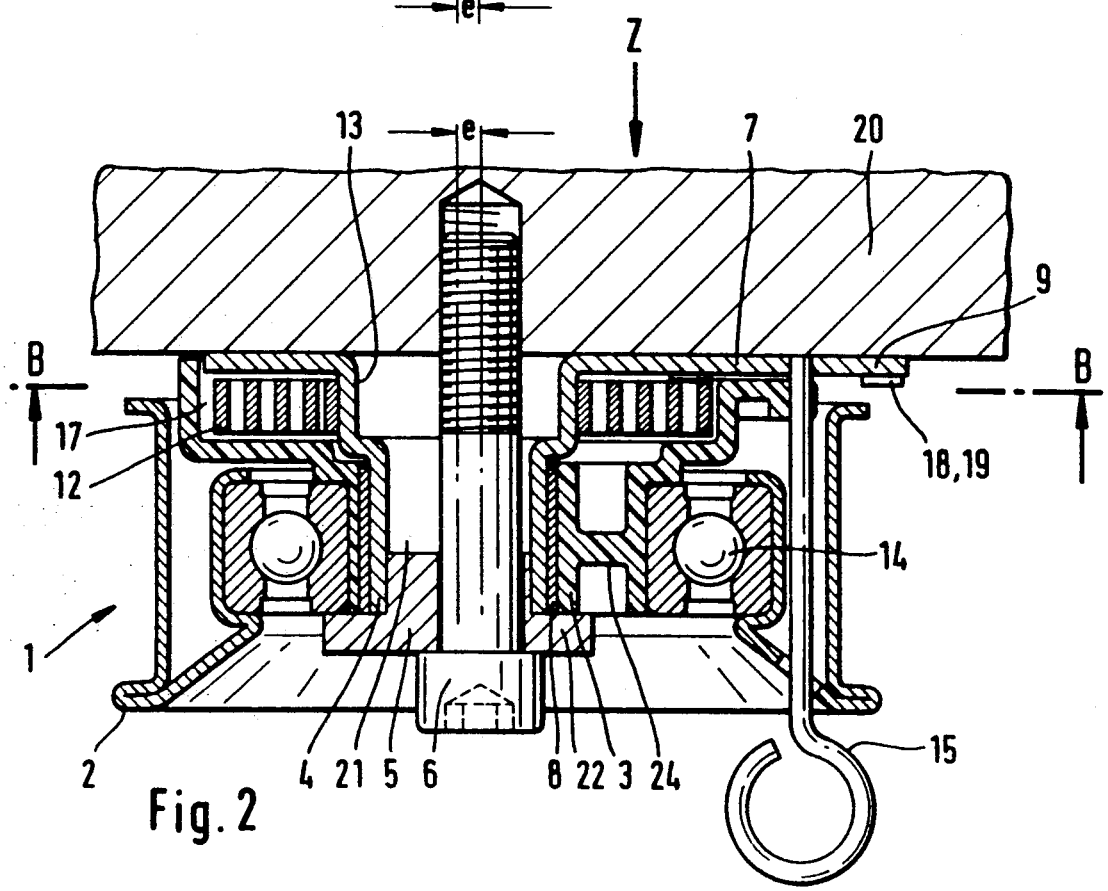

TENSION FOR BELTS OR CHAINS

STATE OF THE ART

A pre-adjustable spring-loadable tensioner for belts or chains, in particular for a control gear of an internal combustion engine, comprising a tension roller mounted on a tension roller support of eccentric configuration which in its turn is guided on an eccentric inner component which can be screwed onto the housing, the tensioner further comprising a spring resiliently urging the tension roller support against the housing is known from EP-A-04 56 142 and comprises two eccentrics which displace the tension roller with regard to one side of the belt. A first eccentric is constituted by the tension roller support on which a rolling bearing is arranged, a flanged eccentric bush with an eccentric inner bore serves as a second eccentric and can be urged against the housing by a fastening screw. The spring, which exerts a tensioning force on the tension roller support in the peripheral direction around the bearing neck, is articulated at one end on the tension roller support and at the other end on a disk-shaped adjusting element.

The required pre-tension of the spring, which can be fixed by turning the adjusting element, is determined in a measuring operation and the adjusting element is then secured un-rotatably in this position to the bearing neck. The adjustment of the belt or chain tensioning force with such a tensioner is very complicated and imprecise because the position of both the eccentrics and also the position of the point of articulation of the spring can change during the mounting adjustment of the tensioner which is effected by turning the support pin which is eccentrically guided with respect to a fastening screw. Therefore, no exactly defined positions or setting values can be pro-rated for respecting a pre-determined driving belt tension. Moreover, the known tensioner is relatively expensive with regard to fabrication and assembly of the individual components used.

OBJECTS OF THE INVENTION

It is an object of the invention to provide a tensioner which can be very exactly adjusted in a simple manner, which has an optimized structure in respect of design space, comprises only a few individual parts, has a large range of adjustment both in the pre-assembly and in the operational state, permits a simple pre-assembly and can be manufactured on a large industrial scale.

These and other objects of the invention will become obvious from the following detailed description.

THE INVENTION

The pre-adjustable, spring-loadable tensioner of the invention for belts or chains, in particular for a control gear of an internal combustion engine, comprising a tension roller (2) mounted on a tension roller support (3) of eccentric configuration which in turn is guided on an eccentric inner component which can be screwed onto a housing (20), the tensioner (1) further comprising a spring (12, 29) resiliently urging the tension roller support (3) against the housing (20) is characterized in that the inner component comprises a flanged eccentric bush (5) which engages freely rotatable into a base plate (7) which is guided by a radial guide arm (9) on the housing (20).

The inner component comprises a flanged eccentric bush which engages freely rotatable into a base plate which is guided by a radial guide arm on the housing.

By virtue of this radial guide arm, a connecting-rod type of movement takes place when the eccentric bearing neck is angularly displaced, during which movement the tension roller is guided almost exactly in a plane perpendicular to the belt or chain. During this adjusting operation, the position of the working eccentric constituted by the tension roller support and the position of the points of articulation of the spring are only insignificantly changed. This design of the adjusting device has considerable advantages over the state of the art with regard to the required adjustment of the belt tensioning force.

Preferably, the guide arm is inserted between two lateral stops made as projections for the housing. In this way, by arranging two cast-on projections on the housing, a longitudinal guidance of the guide arm is obtained. Alternatively, it is possible to provide an axially extending pin on the guide arm, the pin engaging into a radially extending slot of the housing. By this type of articulation of the guide arm in the slot, the guide arm can move in the manner of a connecting rod when the bearing neck is angularly displaced. It is, of course, also possible to kinematically reverse this articulation by providing a slot in the guide arm and a pin on the housing.

To maintain the position and orientation of the tensioner of the invention as constant as possible with respect to the belt and to assure a pre-tensioning and damping force acting in the same direction in all operational states, the guide arm or lug of the invention is arranged in the region of the median between the working and the slack side of the belt.

Further advantageous features of the invention are as follows: The operational vibrations of the belt and the thermal expansion of the engine and the belt are absorbed by the tension roller support whose pivoting range is limited so that when the engine is switched off, the tension roller cannot be pushed away so far from the belt that a jumping of teeth can take place. A compact structure of the tensioner is obtained by an axially and-/or radially directed arrangement of directly adjoining components while maintaining the given inner contour of the tension roller. A further advantageous feature of the tensioner of the invention is that it comprises only a few components and is therefore inexpensive and easy to assemble. The simplicity of assembly is further aided by an eccentric flange of hexagonal shape which simplifies the setting of the pre-tensioning force of the belt for adjustment of the tensioner.

According to another feature of the invention, a torsion spring is provided between the base plate and the tension roller support for achieving a desired angular displacement of the tension roller support with respect to the base plate in the operating position. The tension roller support is configured so as to define a clearance or space with respect to the base plate to accommodate the torsion spring. Advantageously, the torsion spring is a flat coil spring with a small axial width which also contributes to the axial compactness of the structure.

An advantageous feature provides for the limitation of the angle of rotation of the tension roller support relative to the base plate. To this end, the tension roller support comprises a recess defined between end stops. A lug or guide arm associated with the unrotatable base plate is inserted through this recess and constitutes a fixed point serving to limit the angular displacement of the tension roller support when one of the end stops comes into contact with the guide arm. The structural design of the tensioner of the invention further permits the base plate to be formed integrally in one piece with the bearing neck. This two-stepped tubular component can further advantageously be made by a non-chipping procedure and is therefore economical to manufacture.

According to another feature of the invention, the flanged eccentric bush is fitted into the bore of the bearing neck and the integrally formed hexagon-shaped flange of the bush forms a collar which radially covers the front ends of the bearing neck and the tension roller support and also partially covers the inner ring of the radial rolling bearing thus serving as an axial securing device for the rolling bearing. The collar further serves to effect a force-mounting of the bearing neck and by this, of the base plate, on a housing associated with the tensioner of the invention.

To achieve an effective frictional damping of any sympathetic vibrations occurring in the belt of the tensioner of the invention, a slide bush is arranged between the bearing neck and the tension roller support, which slide bush extends over the entire axial width of the bearing neck and therefore advantageously requires only a small radial design space. In a further development of the invention, the tension roller is made by a non-chipping procedure and un-rotatably mounted on the outer ring of the rolling bearing.

To facilitate mounting, the tensioner can be pre-assembled with the help of a retention pin which locks the tension roller, the tension roller support and the base plate together and fixes their positions relative to one another. Advantageously, the tension roller support is fixed with the help of a retention pin in the center of the operating range so that after pre-adjustment of the belt tensioning force by means of the eccentric flange and subsequent screwing-on of the tensioner, a maximum displacement path of the tension roller is available.

Referring now to the drawings:

FIG. 1 is a front view of one tensioner of the invention and

FIG. 2 is the tensioner of the invention in a cross-sectional view along line A—A of FIG. 1;

Figure 3:
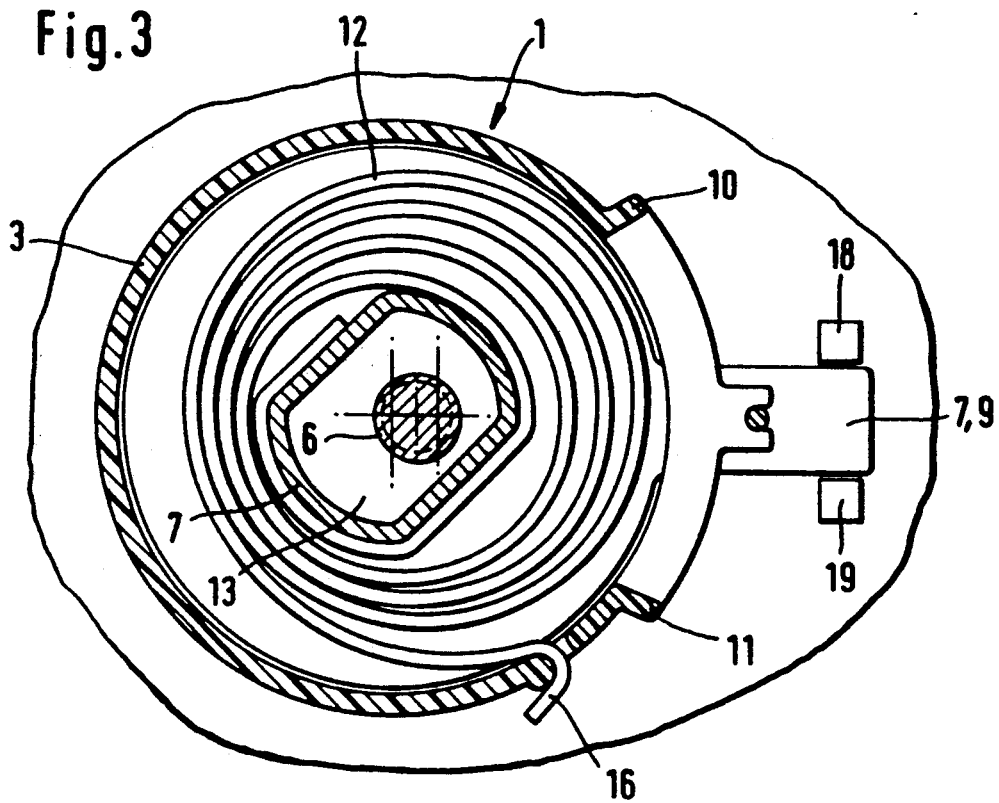
FIG. 3 is a cross-sectional view along line B—B of FIG. 2.

FIG. 1 is a front view of the tensioner of the invention whose outer contour is determined by the tension roller 2 which covers almost all components radially with the exception of a lug or guide arm 9 which is fixed between two stops 18 and 19 to prevent the base plate 7 from rotating. In the region of the guide arm 9, a bore 23 is arranged in the tension roller 2 for receiving a retention pin 15 by which the tension roller 2 together with the tension roller support 3 and the base plate 7 can be positioned before mounting the tensioner 1. In the central region of the tension roller 2, a flanged eccentric bush 5 with a hexagonal flange is arranged offset from the center of the tension roller and itself comprises an off-center bore through which a hexagon socket screw 6 is inserted.

The cross-sectional view of FIG. 2 further elucidates the structure of the tensioner 1 of the invention, in which the tension roller 2 covers almost all components in the axial direction as well. The tensioner 1 bears by the base plate 7 against a housing 20, preferably a crankcase or a cylinder head of an internal combustion engine, and has a substantially circular ring-shaped outer contour except at the location of a guide arm 9. In the region of the hub 13, the base plate 7 extends axially, starting from the housing 20, to form a tubular portion whose end region constitutes the bearing neck 4. In the region of the hub 13, the inner tubular contour is oval in shape and merges into a bore 21, an inwardly directed step or shoulder being formed between the hub 13 and the bore 21.

The bearing neck 4 serves to receive and guide the tension roller support 3, the radial gap between these two components being filled by a slide bush 8. The hub 24 of the tension roller support 3 comprises an off-center bore to obtain eccentricity. The outer periphery of the hub 24 serves to receive the rolling bearing 14 on whose outer ring the tension roller 2 is supported. Starting from the bearing neck 4, the tension roller support 3 widens radially in the direction of the base plate 7 and forms a space 17 in which the torsion spring 12 is inserted. In FIG. 2, the tensioner of the invention is shown with the largest possible eccentricity between the base plate 7 and the tension roller support 3 which is obtained with the help of the retention pin 15, which fixes the tension roller 2 to the tension roller support 3 and the base plate 7 in this position. This position is fixed prior to mounting in order to be able to avail of the largest possible adjusting or re-adjusting path of the tension roller 2, for example on variation of belt lengths.

The arrangement of the tensioner 1 is such that, i.e. the torsion spring 12 is disposed between the outer periphery of the hub 13, and the tension roller support 3 so that in the operating state, the tension roller 2 is constantly urged in a direction to increase the belt tension. The alignment of the tensioner 1 during mounting is further assisted by the flanged eccentric bush 5 which is fitted into the bore 21 of the bearing neck 4 and whose off-center bore serves to receive the screw arrangement 6 by which the entire tensioner 1 is force-mounted on the housing 20. By virtue of the hexagon-shaped collar 22 which can be turned through 360°, an advantageous wide range of adjustment of the tensioner 1 is obtained which corresponds to double the value of eccentricity "e" established between the center of the screw arrangement 6 and the center of the flanged eccentric bush 5. This pre-adjustment enables the tensioner 1 to be aligned in the direction of the belt without any remarkable change in the direction of force of the tensioner in the operating state by reason of the prevention of rotation of the base plate 7, i.e. of the guide arm 9 which is positioned between the stops 18, 19.

FIG. 3 shows the installed position of the torsion spring 12 which in its central region encloses the oval-shaped hub 13 of the base plate 7 to the greatest possible extent, and whose other spring end 16 is locked in the tension roller support 3. FIG. 3 further clearly shows the limitation of the adjusting displacement of the tension roller support 3 with respect to the base plate 7 by the projections 10, 11 which form the ends of a local recess 25 in the tension roller support 3 through which the guide arm 9 of the base plate 7 is inserted.

Figure 4:
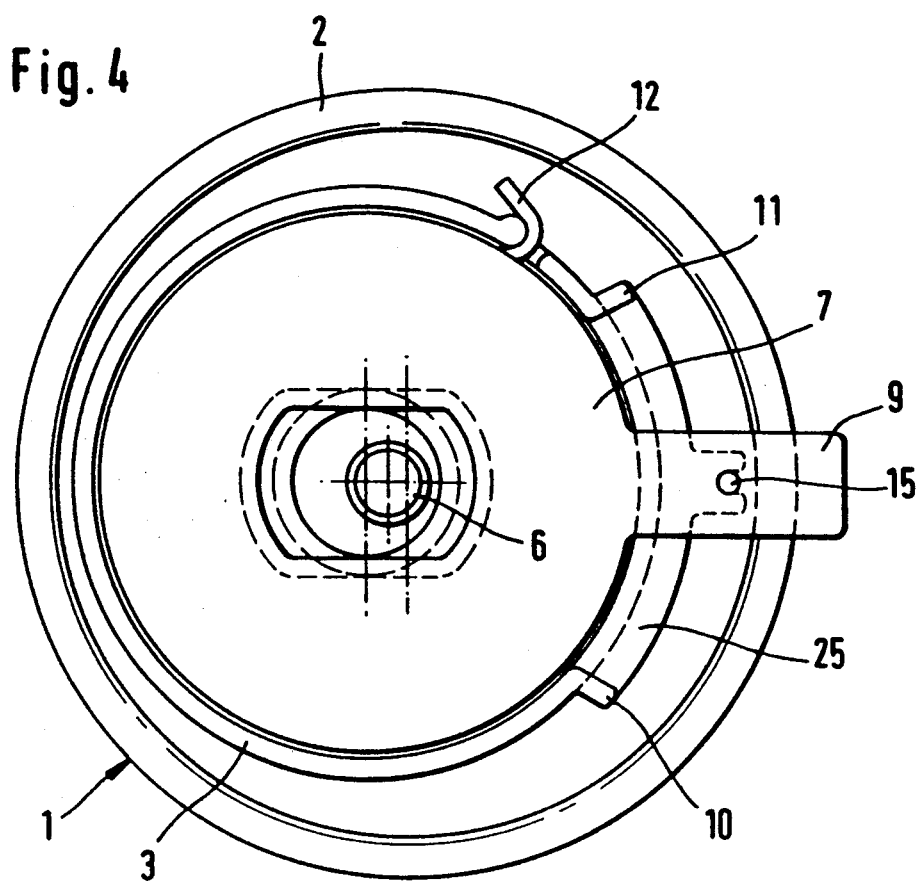
FIG. 4 is a view of the tensioner of the invention in a view corresponding to Z, see FIG. 2.

The view of tensioner 1 in FIG. 4 further elucidates the limitation of the adjusting displacement of the tension roller support 3. As can be seen in association with FIG. 2, the base plate 7 is covered both radially and axially by the tension roller support 3 except at the guide arm 9. An angular displacement of the tension roller support 3 is therefore terminated when one of the end stops 10, 11 comes into contact with the guide arm 9.

Figure 5:
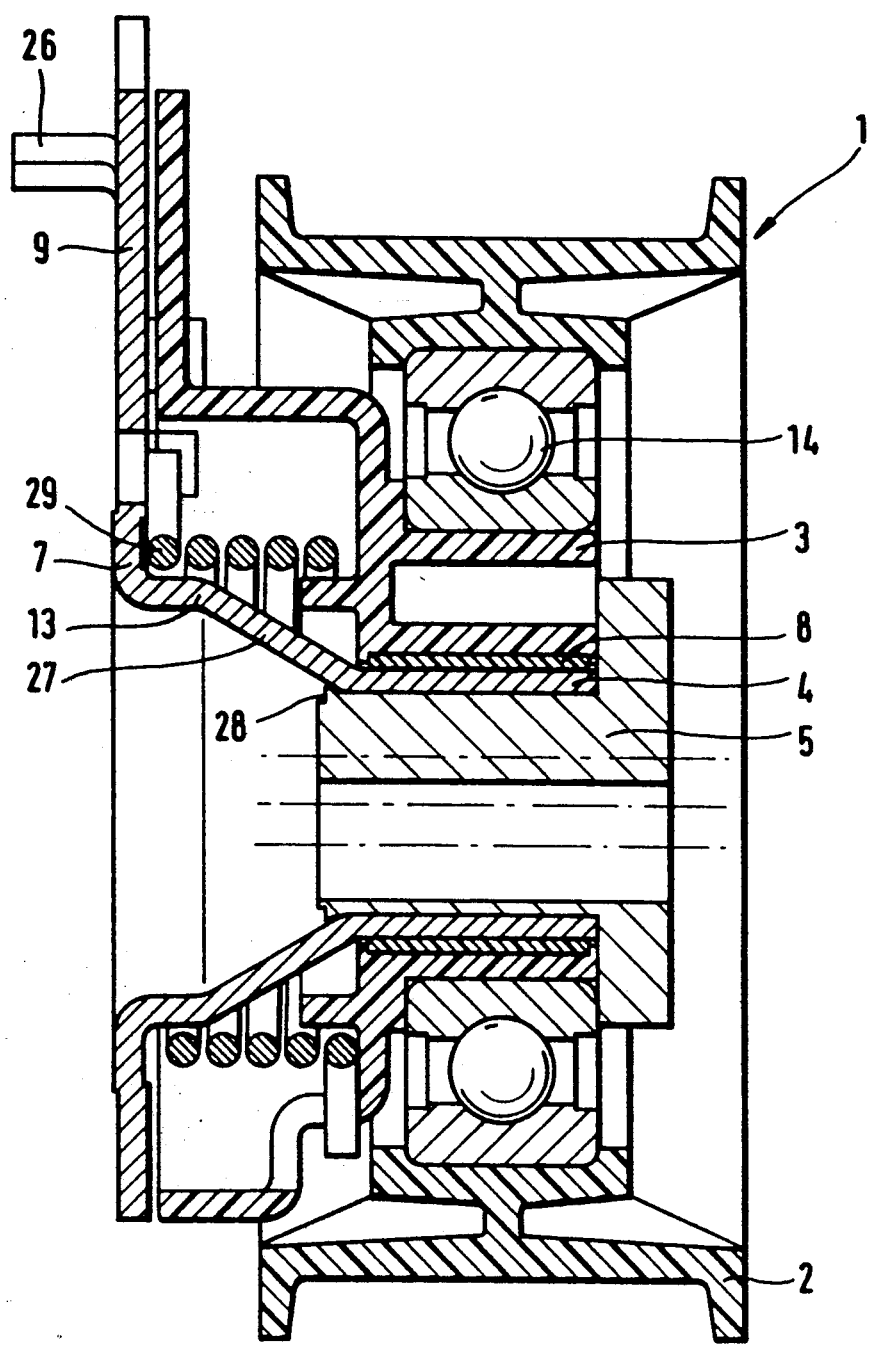
FIG. 5 is a longitudinal cross-section through a further embodiment of the tensioner of the invention.

A further development of the tensioner of the invention is represented in FIG. 5. This tensioner 1 corresponds essentially to that of FIG. 1 but one difference lies in the fact that the flanged eccentric bush 5 has a larger axial design length and its end away from the hexagon extends into the interior of a conically widening portion 27 of the bearing neck 4. This end of the flanged eccentric bush 5 is swaged at 28 so that all components are fixed axially with respect to one another in the pre-assembly stage. Again, a coil spring 29 is used, which is likewise arranged in the hub 13 of the tension roller support 3. The guide arm 9 of the base plate 7 comprises a pin 26 which, when the mounting of the tensioner has been completed, engages into a slot, not represented, in the housing 20 so that on angular displacement of the flanged eccentric bush 5, the guide arm 9 carries out directional movements after the manner of a connecting rod.

Various modifications of the tensioner of the invention may be made without departing from the spirit or scope thereof and it is to be understood that the invention is intended to be limited only as defined in the appended claims.

What I claim is:

1. A pre-adjustable, spring-loadable tensioner (1) for belts or chains, in particular for a control gear of an internal combustion engine, comprising a tension roller (2) mounted on a tension roller support (3) of eccentric configuration which in turn is guided on an eccentric inner component which can be screwed onto a housing (20), the tensioner (1) further comprising a spring (12,29) resiliently urging the tension roller support (3) against the housing (20), characterized in that the inner component comprises a flanged eccentric bush (5) which engages freely rotatable into a base plate (7) which is guided by a radial guide arm (9) on the housing (20).

2. A tensioner of claim 1 wherein the guide arm (9) is inserted between two lateral stops (18,19) formed as projections of the housing (20).

3. A tensioner of claim 1 wherein an axially extending pin (26) is provided on the guide arm (9), the pin (26) engaging into a radially extending slot of the housing (20).

4. A tensioner of claim 2 wherein the guide arm (9) extends essentially along a median between a working and a slack side of the belt associated with the tensioner 1.

5. A tensioner of claim 3 wherein the guide arm (9) extends essentially along a median between a working and a slack side of the belt associated with the tensioner 1.

6. A tensioner of claim 1 wherein the flanged eccentric bush (5) has a multi-sided profile by which it can be turned for setting a pre-tension in the belt or the chain.

7. A tensioner of claim 1 wherein the tension roller support (3) is designed to cover the base plate (7) and the bearing neck (4) axially and, to the greatest possible extent, also radially.

8. A tensioner of claim 7 wherein the base plate (7) is connected with a tubular bearing neck (4) on whose outer peripheral surface the tension roller support (3) is mounted and within whose inner peripheral surface the flanged eccentric bush (5) is mounted.

9. A tensioner of claim 1 wherein the tension roller support (3), at its end facing towards the base plate (7) forms a space (17) for a torsion spring (12).

10. A tensioner of claim 1 wherein the tension roller support (3) comprises end stops (10,11) for limiting the angle of rotation between the base plate (7) and the tension roller support (3).

11. A tensioner of claim 1 wherein the base plate (7) and the bearing neck (4) are made as a two-stepped tubular component comprising an inner tubular space which has an oval contour in the region of a hub (13) and merges into a bore (21) in the region of the bearing neck (4).

12. A tensioner of claim 8 wherein the base plate (7) is made in one piece with the bearing neck (4), and the component is fabricated by a non-chipping procedure.

13. A tensioner of claim 1 wherein the flanged eccentric bush (5) is fitted into a bore (21) of the bearing neck (4) and comprises a hexagon-shaped collar (22) which serves to axially fix a rolling bearing (14) and with whose help the base plate (7) is force-mounted on the housing (20) by a screw arrangement (6).

14. Tensioner of claim 1 wherein the tension roller support (3) is connected to the bearing neck (4) by a slide bush (8) whose axial width corresponds to that of the bearing neck (4).

15. Tensioner of claim 1 wherein a tension roller (2) made by a non-chipping procedure is arranged un-rotatable on an outer ring of the rolling bearing (14).

16. A tensioner of claim 1 wherein a retention pin (15) locks the tension roller (2), the tension roller support (3) and the base plate (7) together and fixes their positions relative to one another.

* * * * *